US 7,788,595 B2

(12) United States Patent
Biwer et al.

(10) Patent No.: US 7,788,595 B2
(45) Date of Patent: Aug. 31, 2010

(54) METHOD AND SYSTEM FOR SWITCHING AMONG MANAGEMENT SYSTEM APPLICATIONS (75) Inventors: Michael Biwer, Lauterbach (DE); Jochen Comes, Schmelz (DE)

(73) Assignee: SAP AG, Walldorf (DE)

( * ) Notice: Subject to any disclaimer, the term of this patent is extended or adjusted under 35 U.S.C. 154(b) by 663 days.

(21) Appl. No.: 11/074,367

(22) Filed: Mar. 7, 2005

(65) Prior Publication Data
US 2005/0210406 A1    Sep. 22, 2005

Related U.S. Application Data

(60) Provisional application No. 60/551,221, filed on Mar. 8, 2004, provisional application No. 60/563,284, filed on Apr. 16, 2004.

(51) Int. Cl.
G06F 3/048 (2006.01)
(52) U.S. Cl. ............... 715/792; 715/784; 715/759; 715/767; 715/778; 715/802; 715/786
(58) Field of Classification Search ......... 715/804, 715/732, 767, 778, 784, 785, 786, 792, 793, 715/794, 795, 796, 797, 802, 805, 779, 765
See application file for complete search history.

(56) References Cited

U.S. PATENT DOCUMENTS

| | | | |
|---|---|---|---|
| 5,400,253 A | 3/1995 | O'Connor | |
| 5,712,995 A * | 1/1998 | Cohn | 715/792 |
| 5,758,327 A | 5/1998 | Gardner et al. | |
| 5,929,854 A * | 7/1999 | Ross | 715/783 |
| 5,930,771 A | 7/1999 | Stapp | |
| 5,999,914 A | 12/1999 | Blinn et al. | |
| 6,029,139 A | 2/2000 | Cunningham et al. | |
| 6,151,608 A | 11/2000 | Abrams | |
| 6,215,490 B1 * | 4/2001 | Kaply | 715/788 |
| 6,507,851 B1 | 1/2003 | Fujiwara et al. | |

(Continued)

FOREIGN PATENT DOCUMENTS

JP    2004-030343    1/2004

OTHER PUBLICATIONS

U.S. Appl. No. 60/374,892, filed Apr. 22, 2002, Krajec.

(Continued)

Primary Examiner—Weilun Lo
Assistant Examiner—Rashedul Hassan
(74) Attorney, Agent, or Firm—Foley & Lardner LLP (57) ABSTRACT

A method of switching among management system applications includes displaying data associated with at least a first one of the management system applications using a graphical user interface screen for use with a computerized management system for at least one of products and services. The graphical user interface screen is configured to display data associated with the management system applications in an individual area for each management system application. The graphical user interface screen includes buttons configured to facilitate switching among the management system applications. The method also includes receiving a user selection of one of the buttons, and switching from the individual area displaying the data associated with the first one of the management system applications to the individual area displaying data associated with a second one of the management system applications in response to the received user selection.

21 Claims, 12 Drawing Sheets

U.S. PATENT DOCUMENTS

| | | | |
|---|---|---|---|
| 6,831,666 B1* | 12/2004 | Kreis | 715/781 |
| 6,868,528 B2 | 3/2005 | Roberts | |
| 6,910,017 B1 | 6/2005 | Woo et al. | |
| 6,980,966 B1 | 12/2005 | Sobrado et al. | |
| 7,092,929 B1 | 8/2006 | Dvorak et al. | |
| 7,117,165 B1 | 10/2006 | Adams et al. | |
| 7,117,451 B2* | 10/2006 | Sielken | 715/788 |
| 7,117,452 B1* | 10/2006 | Pavelski et al. | 715/792 |
| 7,124,373 B1* | 10/2006 | Patil | 715/779 |
| 7,139,731 B1 | 11/2006 | Alvin | |
| 2001/0034559 A1* | 10/2001 | Brown et al. | 700/17 |
| 2001/0039517 A1 | 11/2001 | Kawakatsu | |
| 2002/0023500 A1 | 2/2002 | Chikuan et al. | |
| 2002/0026368 A1 | 2/2002 | Carter | |
| 2002/0054141 A1* | 5/2002 | Yen et al. | 345/804 |
| 2002/0059108 A1 | 5/2002 | Okura et al. | |
| 2002/0078159 A1 | 6/2002 | Petrogiannis et al. | |
| 2002/0107713 A1 | 8/2002 | Hawkins | |
| 2002/0122066 A1* | 9/2002 | Bates et al. | 345/786 |
| 2002/0123930 A1 | 9/2002 | Boyd et al. | |
| 2002/0147668 A1 | 10/2002 | Smith et al. | |
| 2002/0184116 A1 | 12/2002 | Tam et al. | |
| 2003/0023500 A1 | 1/2003 | Boies et al. | |
| 2003/0028437 A1 | 2/2003 | Grant et al. | |
| 2003/0046120 A1 | 3/2003 | Hoffman et al. | |
| 2003/0046195 A1 | 3/2003 | Mao | |
| 2003/0117440 A1* | 6/2003 | Hellyar et al. | 345/767 |
| 2003/0158791 A1 | 8/2003 | Gilberto et al. | |
| 2003/0172007 A1 | 9/2003 | Helmolt et al. | |
| 2003/0212617 A1 | 11/2003 | Stone et al. | |
| 2003/0229502 A1 | 12/2003 | Woo | |
| 2004/0098358 A1 | 5/2004 | Roediger | |
| 2004/0113934 A1* | 6/2004 | Kleinman et al. | 345/732 |
| 2004/0148136 A1* | 7/2004 | Sasaki et al. | 702/188 |
| 2004/0162763 A1 | 8/2004 | Hoskin et al. | |
| 2004/0186783 A1 | 9/2004 | Knight et al. | |
| 2004/0220861 A1 | 11/2004 | Morciniec et al. | |
| 2004/0267674 A1 | 12/2004 | Feng et al. | |
| 2005/0055283 A1 | 3/2005 | Zarovinsky | |
| 2005/0060270 A1 | 3/2005 | Ramakrishnan | |
| 2005/0086122 A1 | 4/2005 | Cirulli et al. | |
| 2005/0096963 A1 | 5/2005 | Myr et al. | |
| 2005/0102192 A1 | 5/2005 | Gerrits et al. | |
| 2005/0102227 A1 | 5/2005 | Solonchev | |
| 2005/0165659 A1 | 7/2005 | Gruber | |
| 2005/0261954 A1 | 11/2005 | Aoyama et al. | |
| 2006/0020512 A1 | 1/2006 | Lucas et al. | |
| 2006/0036507 A1 | 2/2006 | Pujar et al. | |
| 2006/0112099 A1 | 5/2006 | Musgrove et al. | |
| 2008/0125906 A1 | 5/2008 | Bates et al. | |

OTHER PUBLICATIONS

"Beyond Markdown Management", summer/autumn 03, the 4caster, Iss 4, vol. 2.

"Retailers Manage Markdown Challenges Using i2 Solutions", Jan. 13, 2003, NFR 92nd Annual Convention & Expo, 2 pgs.

Melcher, Rachel, "Local tech firm creates retail markdown tool", Mar. 24, 2000, Cincinnati Business Courier, 3 pgs.

ProfitLogic, available at http://web.archive.org/web/20020603 11838/http://profitlogic.com/, available at least by Apr. 15, 2005 (22 pp.).

Subrahmanyan et al., "Developing optimal pricing and inventory policies for retailers who face uncertain demand", Journal of Retailing, vol. 72, No. 1, Spring, 1996 (p. 7 (24)).

Author unknown, "Staffware and Biomni Join Forces to Provide End-to-End E-Procurement Solution with Enhanced Workflow Capability: Self-Service Functionality will Enable Thousands of Transactions to be Handled Daily from the Desktop," M2 Presswire, Coventry, Feb. 6, 2001, 1 page.

Kelkar et al., Price Modeling in Standards for Electronic Product Catalogs Based on XML, 2002, pp. 366-375.

Srinivasan et al., Concepts and strategy guidelines for designing value enhancing sales promotions, Journal of Product and Brand Management, vol. 7, No. 5, 1998, pp. 410-420.

* cited by examiner

METHOD AND SYSTEM FOR SWITCHING AMONG MANAGEMENT SYSTEM APPLICATIONS

CROSS-REFERENCE TO RELATED PATENT APPLICATIONS

This application claims the benefit of U.S. Provisional Application No. 60/551,221, filed Mar. 8, 2004 and entitled "Inventory Management," and U.S. Provisional Application No. 60/563,284, filed Apr. 16, 2004 and entitled "Inventory Management," both of which are hereby incorporated by reference.

BACKGROUND

The present description relates generally to the field of managing retail products and services. More particularly, the present invention relates to a method and system for switching among applications in an automated management system for retail products and services Marketing products and services involves a large number of tasks. Those tasks may involve budgeting, inventory, pricing, purchasing, etc. In turn, each of these tasks may involve various subtasks and/or manipulation of various subsets of data. For example, purchasing tasks may include management of item data, scheduling data, budgeting data, etc. for the items in various purchasing documents during various phases of the purchasing process.

Automated management systems for retail products and services may provide multiple applications for performing the various tasks associated with marketing products and services. While performing these tasks, users of the automated management system may need to switch back and forth or otherwise switch among the various applications. Switching among the various applications may be difficult depending on, for example, the number of different applications and amount of display area available for graphical user interface screens for each application, the number of different control buttons, menus, and icons associated with each application and the available space for the different control buttons, menus, and icons, etc.

There is need for a method and system for switching among management system applications for products and services that provides a unified framework for efficiently switching among applications and that is easy to use.

SUMMARY

According to an exemplary embodiment, a method of switching among management system applications includes displaying data associated with at least a first one of the management system applications using a graphical user interface screen for use with a computerized management system for at least one of products and services. The graphical user interface screen is configured to display data associated with the management system applications in an individual area for each management system application. The graphical user interface screen includes buttons configured to facilitate switching among the management system applications. The method also includes receiving a user selection of one of the buttons, and switching from the individual area displaying the data associated with the first one of the management system applications to the individual area displaying data associated with a second one of the management system applications in response to the received user selection.

According to another exemplary embodiment, a system for switching among management system applications includes means for displaying data associated with at least a first one of the management system applications using a graphical user interface screen for use with a computerized management system for at least one of products and services. The graphical user interface screen is configured to display data associated with each of the management system applications in an individual area for each application. The graphical user interface screen includes buttons configured to facilitate switching among the management system applications. The system also includes means for receiving a user selection of one of the buttons, and means for switching from the individual area displaying the data associated with the first one of the management system applications to the individual area displaying data associated with a second one of the management system applications in response to the received user selection.

According to another exemplary embodiment, a program product for switching among management system applications includes machine-readable program code for causing, when executed, one or more machines to perform the steps of displaying data associated with at least a first one of the management system applications using a graphical user interface screen for use with a computerized management system for at least one of products and services, wherein the graphical user interface screen is configured to display data associated with each of the management system applications in an individual area for each application, and wherein the graphical user interface screen includes buttons configured to facilitate switching among the management system applications; receiving a user selection of one of the buttons; and switching from the individual area displaying the data associated with the first one of the management system applications to the individual area displaying data associated with a second one of the management system applications in response to the received user selection.

Other features and advantages of the present invention will become apparent from the following detailed description and accompanying drawings. It should be understood, however, that the detailed description and specific examples are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and.

DETAILED DESCRIPTION

In the following description, for the purposes of explanation, numerous details are set forth in order to provide a thorough understanding of the present invention. It will be evident to one skilled in the art, however, that the exemplary embodiments may be practiced without these specific details. In other instances, structures and device are shown in diagram form in order to facilitate description of the exemplary embodiments. Further, while the method and system is described primarily in the context of retail management systems for retail products and articles such as retail fashion articles, it should be understood that the method and system are applicable in other contexts, including management systems for service providers.

Figure 1:
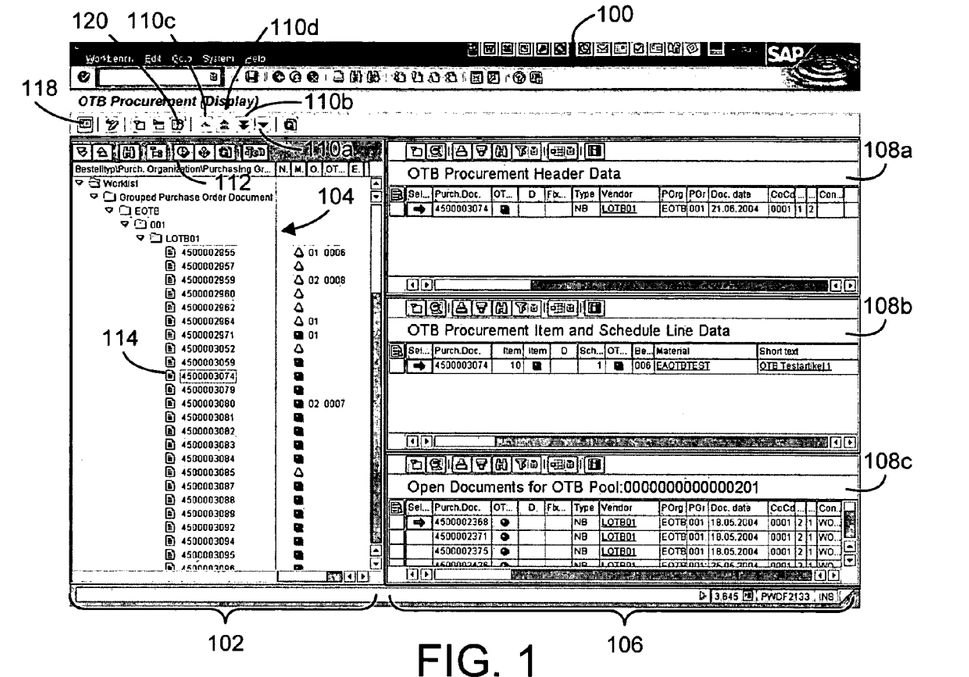
FIG. 1 illustrates a graphical user interface screen for use with a management system workbench and configured to facilitate switching among management system applications according to an exemplary embodiment.

FIG. 1 illustrates a graphical user interface screen 100 for use with an automated management system for products and or services (e.g., retail fashion articles, etc.) and configured to facilitate switching among management system applications according to an exemplary embodiment. Screen 100 may include an area 102 for displaying a worklist 104, and an area 106 for displaying a group of one or more management system applications 108 associated with an item in worklist 104, such as applications 108a, 108b, and 108c shown in FIG. 1. Screen 100 also includes one or more user-actuated inputs (e.g., buttons, icons, etc.) 110 configured to facilitate switching among applications 108. It should be understood that while user-actuated inputs 110 are primarily illustrated and described herein as "buttons" (e.g., a symbol, icon, etc. displayed in screen area 102 and configured to appear as a virtual button that may be depressed), other types of user-actuated inputs displayed as part of a graphical user interface are contemplated as well.

In the illustrated embodiment, screen area 102 starts as an empty workset with no items displayed. A user of system 100 may select button 112 by executing a user input command (e.g., by using a mouse to point to and click on button 112) in order to display worklist 104. Worklist 104 may be, for example, a personalized default list of items associated with a particular user for a particular workbench. In the illustrated embodiment, worklist 104 is a hierarchical default worklist of grouped purchase order documents associated with a particular user of the management system for particular workbench for generating and managing purchase orders.

Once worklist 104 is displayed in screen area 102, the user may select one of the items in worklist 104 by executing a user input command (e.g., by using a mouse to point to and click on an item in worklist 104) in order to display the associated applications 108 in individual areas in screen area 106. For example, in the illustrated embodiment, selecting worklist item 114 causes at least applications 108a, 108b, and 108c to be displayed in individual areas in screen area 106. In addition to applications 108 that are displayed in screen area 106, there may be additional applications 108 that are not displayed in screen area 106 depending on, for example, the amount of area available in screen area 106. These applications may be accessed and viewed using buttons 110 as will be described below. Once applications 108 are displayed in screen area 106 for the selected worklist item, worklist 104 may be hidden from view by selecting button 118 to cause screen area 102 to disappear and screen area 106 to be enlarged to cover the screen area previously devoted to screen area 102 (as shown in FIGS. 2-24).

The associated applications may be software applications that are used to process data in the worklist item. For example, in the illustrated embodiment, applications 108 are software applications for processing purchase order list data in order to generate purchase orders. According to various other embodiments, other types of software applications may be used.

Figure 2:
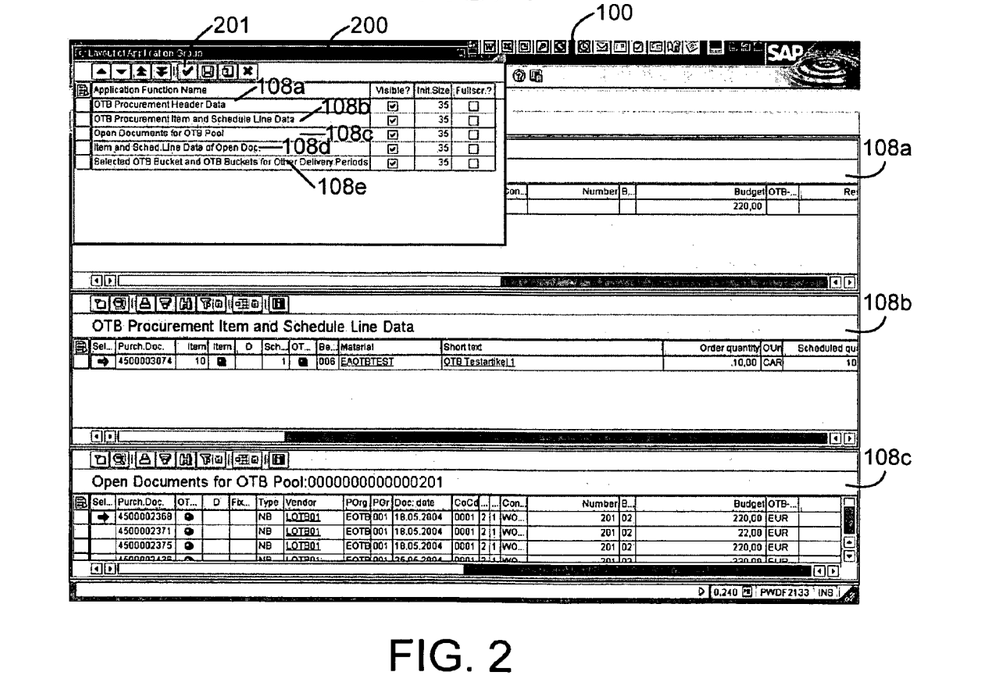
FIG. 2 illustrates an exemplary screen that may be used to display a list of management system applications associated with a selected worklist item and available for display in the graphical user interface screen of FIG. 1.

Screen 100 also includes a button 120 that may be selected by the user to display a list of applications 108 associated with the selected worklist item and available for display within screen area 106. FIG. 2 illustrates an exemplary screen 200 that may be used to display a list of applications 108 associated with the selected worklist item and available for display within screen area 106 once button 120 has been selected. For example, in the illustrated embodiment, selecting button 120 calls screen 200, which displays a list including applications 108a, 108b, 108c, 108d, and 108e. The list displayed in screen 200 represents the order in which applications 108 are displayed in screen area 106. For example, applications 108a, 108b, and 108c, are the first three applications displayed. Applications 108d and 108e are not displayed in screen area 106 due to the amount of area available in screen area 106, but are the next available applications 108 that may be displayed using buttons 110 as will be described below. The user may select a button 201 in order to close screen 200.

Figure 3:
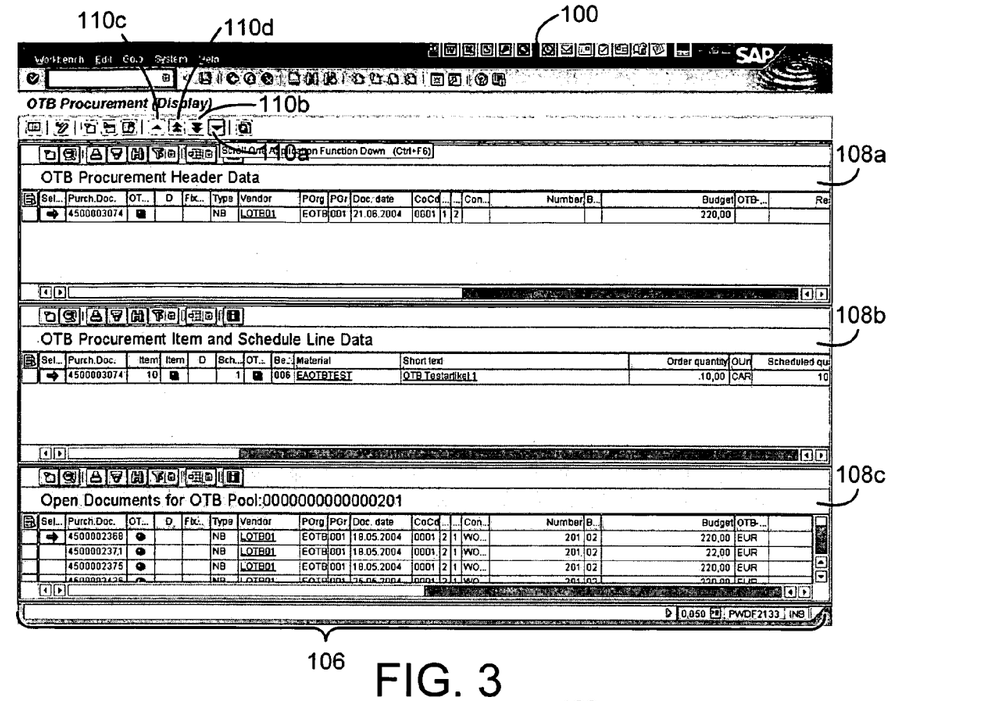
FIG. 3 illustrates an embodiment of the graphical user interface screen of FIG. 1 wherein three out of five applications associated with the selected worklist item and available for display are displayed.

FIG. 3 illustrates an embodiment of graphical user interface screen 100 wherein three out of five applications 108 associated with the selected worklist item and available for display within screen area 106 are displayed in screen area 106, which has been enlarged to cover the screen area previously devoted to screen area 102. As shown in FIG. 3, applications 108a, 108b, and 108c are displayed in screen area 106. Applications 108d and 108e are not displayed. Using buttons 110, the user may move up or down the order of applications 108 that are available for display within screen area 106 in order to switch among the applications. In the illustrated embodiment, the user may use button 110a to move down the order of available applications 108 one application at a time until the desired application or applications 108 are displayed. The user may use button 110b to move down the order of available applications 108 directly to the last application 108 available for display in screen area 106 such that it is the only application displayed in screen area 106. The user may use button 110c to move up the order of available applications 108 one application at a time until the desired application or applications 108 are displayed. The user may use button 110d to move up the order of available applications 108 directly to the first application 108 available for display in screen area 106 such that it is the first application displayed in screen area 106.

Figure 4:
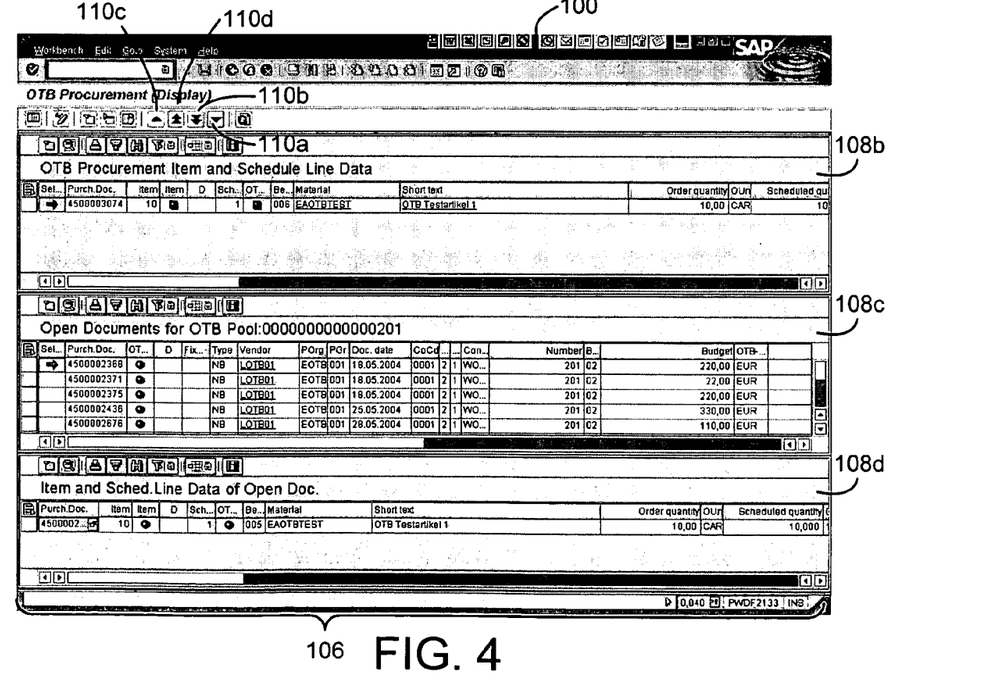
FIG. 4 illustrates an embodiment of the graphical user interface screen of FIG. 1 wherein a button has been used to move down one application in the order of applications.

According to an exemplary embodiment, when the first application in the order of available applications 108 is also the first application displayed in screen area 106, only buttons 110a and 110b are available such that the user may only move down in the order of available applications 108. For example, as shown in FIG. 3, application 108a is the first application displayed in screen area 106, and only buttons 110a and 110b are available to the user. Buttons 108c and 108d are displayed in a lighter shade to indicate that they are currently inactive. In this embodiment, when the first application in the order of available applications 108 is no longer the first application displayed in screen area 106, buttons 110a, 110b, 110c, and 110d are available such that the user may move up or down in the order of available applications 108 (as shown in FIG. 4). When the last application in the order of available applications 108 is also the only application displayed in screen area 106, only buttons 110c and 110d are available such that the user may only move up in the order of available applications 108 (as shown in FIG. 5)

FIG. 4 illustrates an embodiment of screen 100 wherein button 110a has been used to move down one application in the order of applications 108 so that applications 108b, 108c, and 108d are now displayed in order in screen area 106 instead of applications 108a, 108b, and 108c. As shown in FIG. 4, the first application in the order of available applications 108 (i.e., application 108a) is no longer the first application 108 displayed in screen area 106, and buttons 110a, 110b, 110c, and 110d are now available such that the user may move up or down in the order of available applications 108.

Figure 5:
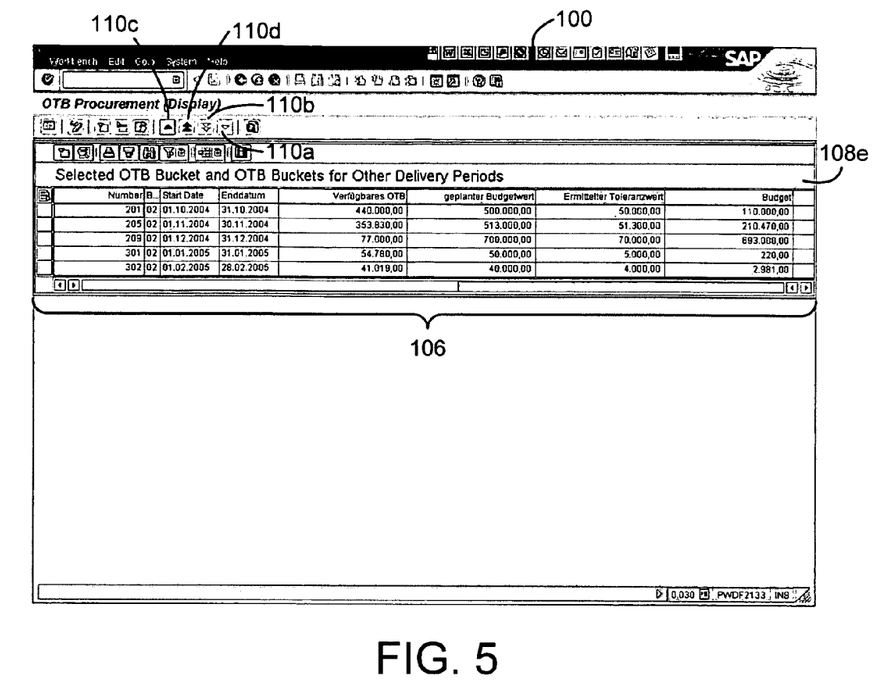
FIG. 5 illustrates an embodiment of the graphical user interface screen of FIG. 1 wherein the button has been used to move down the order of applications one application at a time so that the last application is now the only application displayed.

Similarly, FIG. 5 illustrates an embodiment of screen 100 wherein button 110a has been used four more times to move down the order of applications 108 one application at a time so that the last application, application 108e, is now displayed in screen area 106 instead of applications 108b, 108c, and 108d. As shown in FIG. 5, the last application in the order of available applications 108 is also the only application 108 displayed in screen area 106, and only buttons 110c and 110d are available such that the user may only move up in the order of available applications 108.

Figure 6:
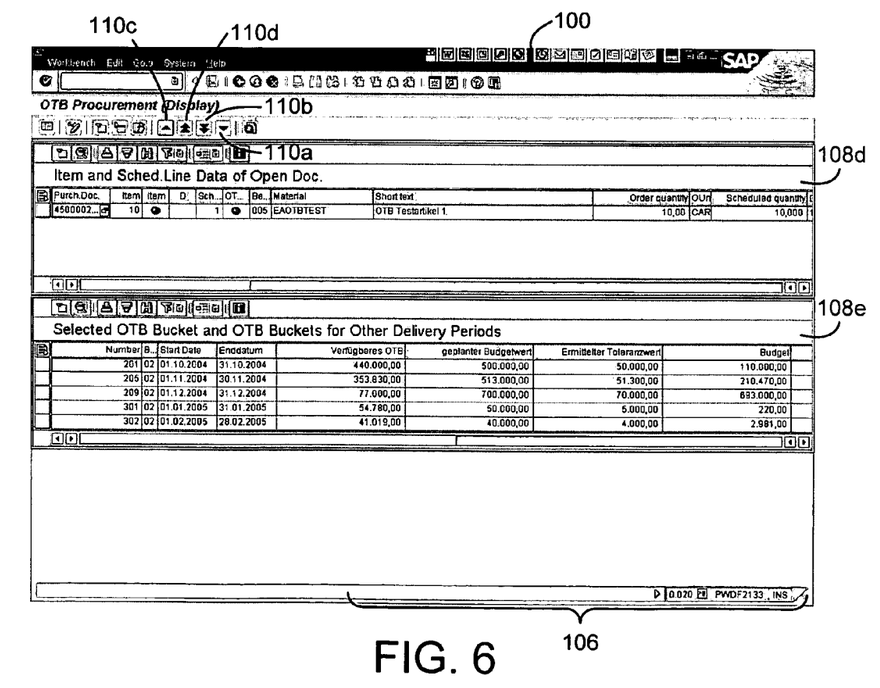
FIG. 6 illustrates an embodiment of the graphical user interface screen of FIG. 1 wherein another button has been used to move up one application in the order of applications 108.

FIG. 6 illustrates an embodiment of screen 100 wherein button 110c has been used to move up one application in the order of applications 108 so that applications 108e and 108e are now displayed in screen area 106 instead of only application 108e as shown in FIG. 5. As shown in FIG. 6, the last application in the order of available applications 108 (i.e., application 108e) is no longer the only application 108 displayed in screen area 106, and buttons 110a, 110b, 110c, and 110d are now available such that the user may move up or down in the order of available applications 108.

Figure 7:
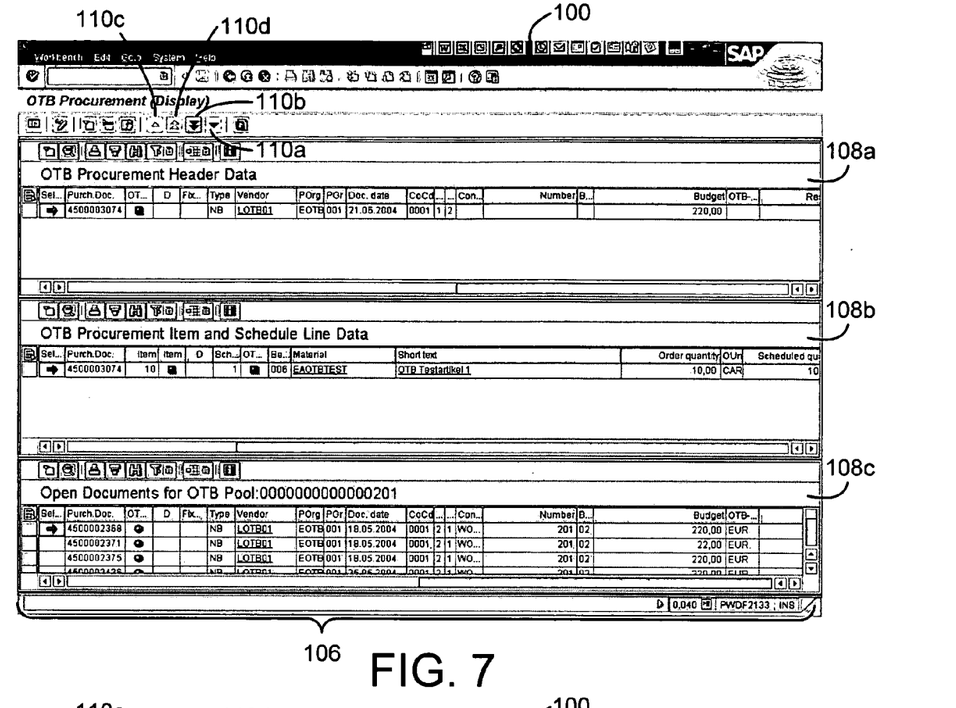
FIG. 7 illustrates an embodiment of the graphical user interface screen of FIG. 1 wherein the button used in FIG. 6 has been used to move up the order of applications one application at a time so that the first application is now the first application displayed.

FIG. 7 illustrates an embodiment of screen 100 wherein button 110c has been used four more times to move up the order of applications 108 one application at a time so that the first application 108a in the order of applications 108 is now displayed in screen area 106 instead of applications 108d and 108e. As shown in FIG. 7, the first application in the order of available applications 108 is also the first application 108 displayed in screen area 106, and only buttons 110a and 110b are available such that the user may only move down in the order of available applications 108.

Figure 8:
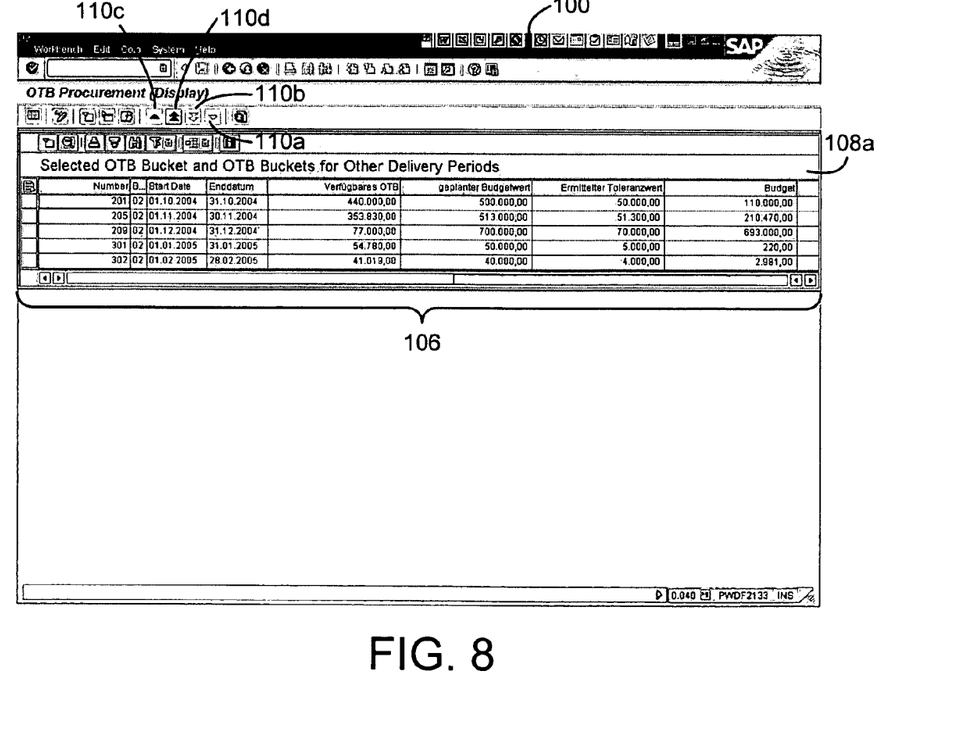
FIG. 8 illustrates an embodiment of the graphical user interface screen of FIG. 1 wherein another button has been used to move down the order of available applications directly to the last application available for display.

FIG. 8 illustrates an embodiment of screen 100 wherein button 110b has been used to move down the order of available applications 108 directly to the last application 108 available for display in screen area 106. As shown in FIG. 8, application 108e is the only application displayed in screen area 106, instead of applications 108a, 108b, and 108c as shown in FIG. 7.

Figure 9:
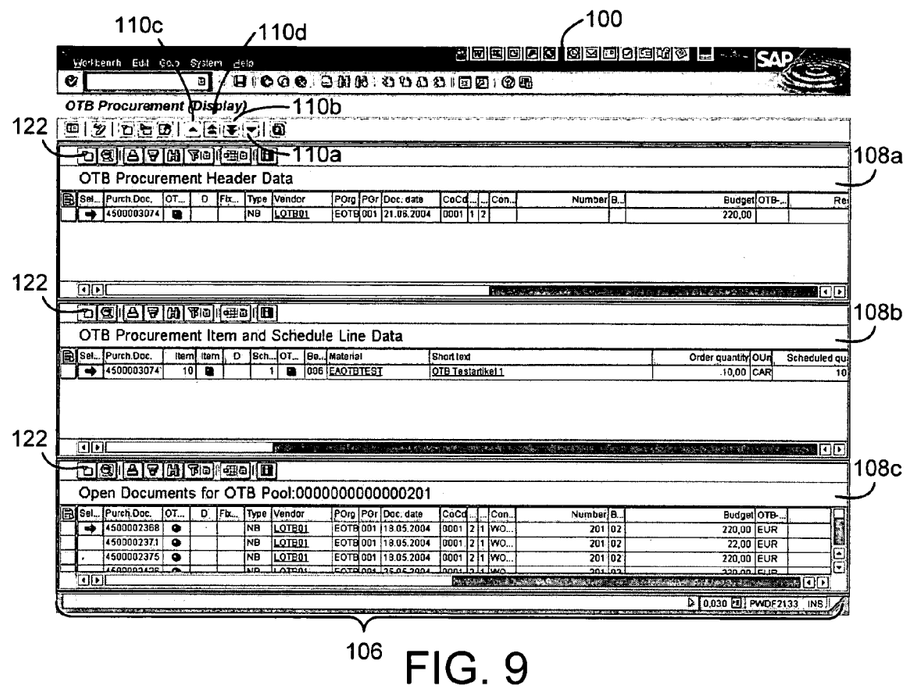
FIG. 9 illustrates an embodiment of the graphical user interface screen of FIG. 1 wherein another button has been used to move up the order of available applications directly to the first application available for display.

FIG. 9 illustrates an embodiment of screen 100 wherein button 110d has been used to move up the order of available applications 108 directly to the first application 108 available for display in screen area 106. As shown in FIG. 9, application 108a is the first application displayed in screen area 106 along with applications 108b and 108c, instead of only application 108e as shown in FIG. 8.

Figure 10:
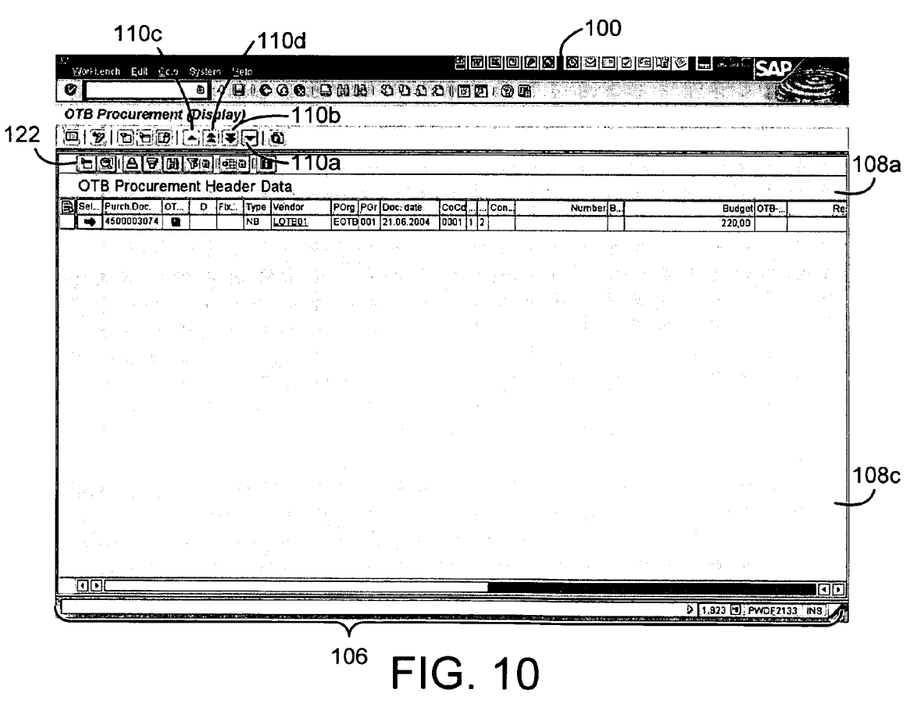
FIG. 10 illustrates an embodiment of the graphical user interface screen of FIG. 1 wherein an application is displayed in a full-screen mode.
Figure 11:
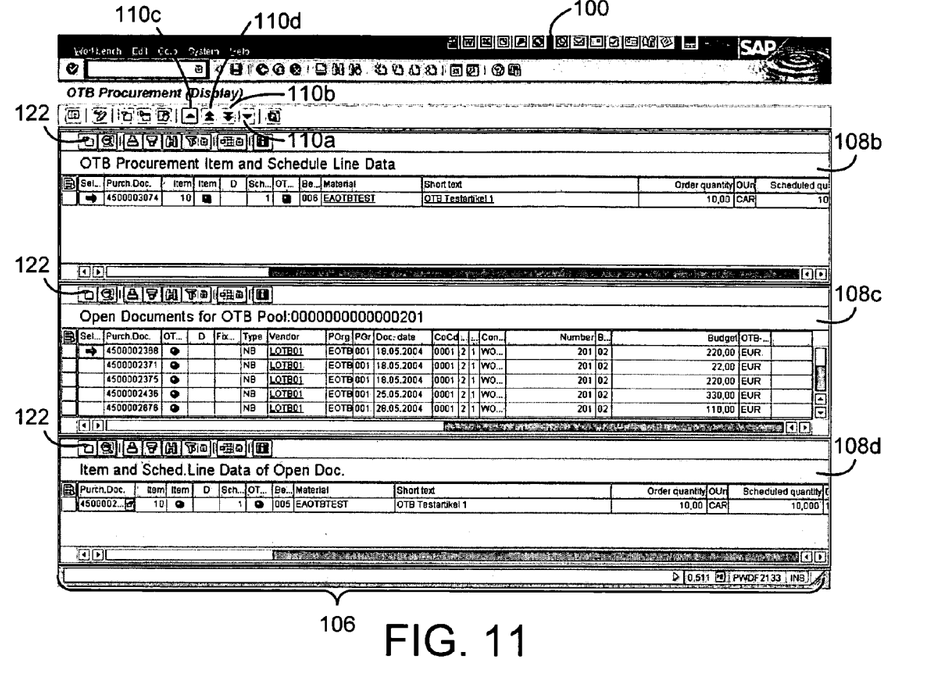
FIG. 11 illustrates an embodiment of the graphical user interface screen of FIG. 1 wherein a button has been used to move down one application in the order of applications from the full screen display of FIG. 10.

According to an exemplary embodiment, each of the applications 108 displayed in screen area 106 includes a button 122 as shown in FIG. 9 that may be selected by the user in order to display the application in a "full-screen" mode. FIG. 10 illustrates an embodiment of screen 100 wherein button 122 shown in FIG. 9 has been used to display application 108a in a full-screen mode. In the full-screen mode shown in FIG. 10, application 108a has been expanded to fill approximately the entire area of screen area 106, including the area previously devoted to applications 108b and 108c.

Figure 12:
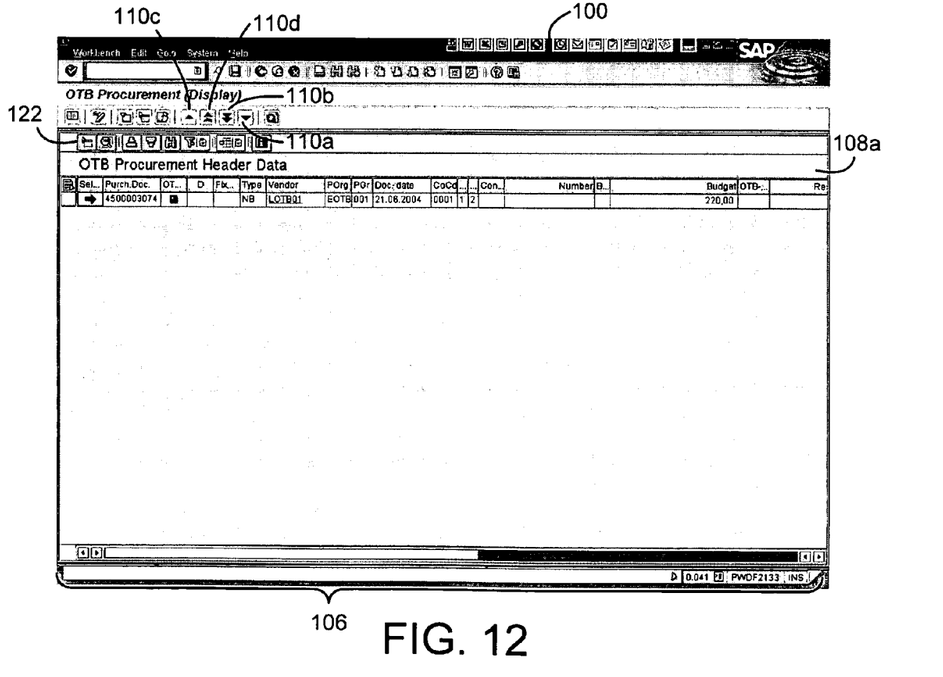
FIG. 12 illustrates an embodiment of the graphical user interface screen of FIG. 1 wherein another button has been used to move up one application in the order of applications to return to the full screen display of FIG. 10.
Figure 13:
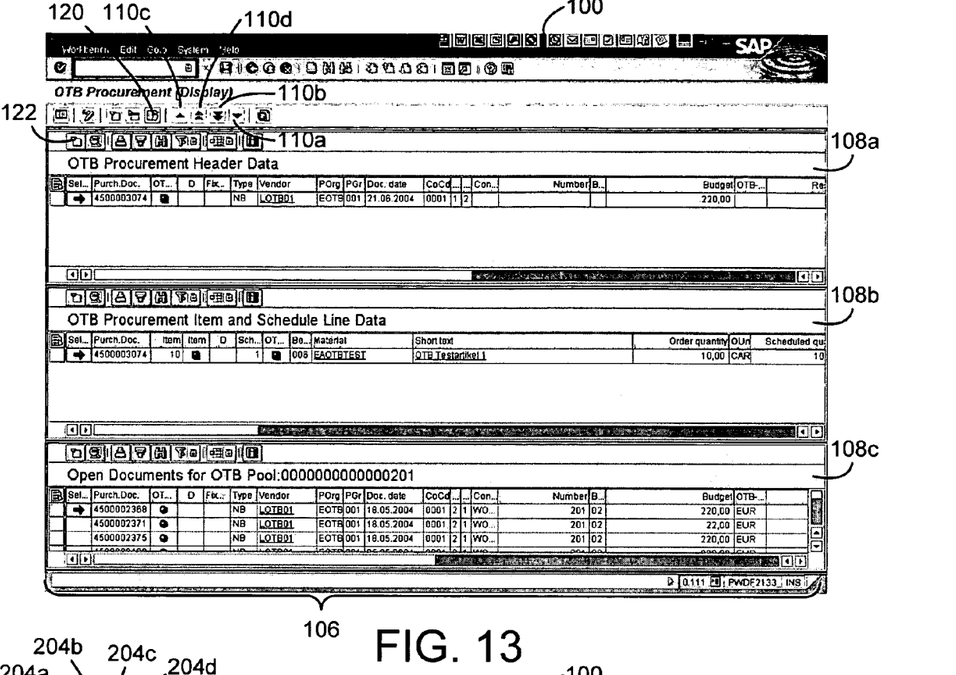
FIG. 13 illustrates an embodiment of the graphical user interface screen of FIG. 1 wherein the full-screen display of FIG. 12 has been switch back to the original size.

While an application 108 is in full-screen mode, buttons 110 may be used to move up or down the order of available applications 108. FIG. 1 illustrates an embodiment of screen 100 wherein button 110a has been used to move down one application in the order of applications 108 so that applications 108b, 108c, and 108d are now displayed in order in screen area 106 instead of full-screen application 108a. As shown in FIG. 1, applications 108b, 108c, and 108d are not displayed in full-screen mode. FIG. 12 illustrates an embodiment of screen 100 wherein button 110c has been used to move up one application in the order of applications so that application 108a is again displayed in screen area 106 in full-screen mode. Selecting button 122 again switches application 108a from full-screen mode to the original size, such that applications 108b and 108c are again displayed in display area 106 as shown in FIG. 13.

Figure 14:
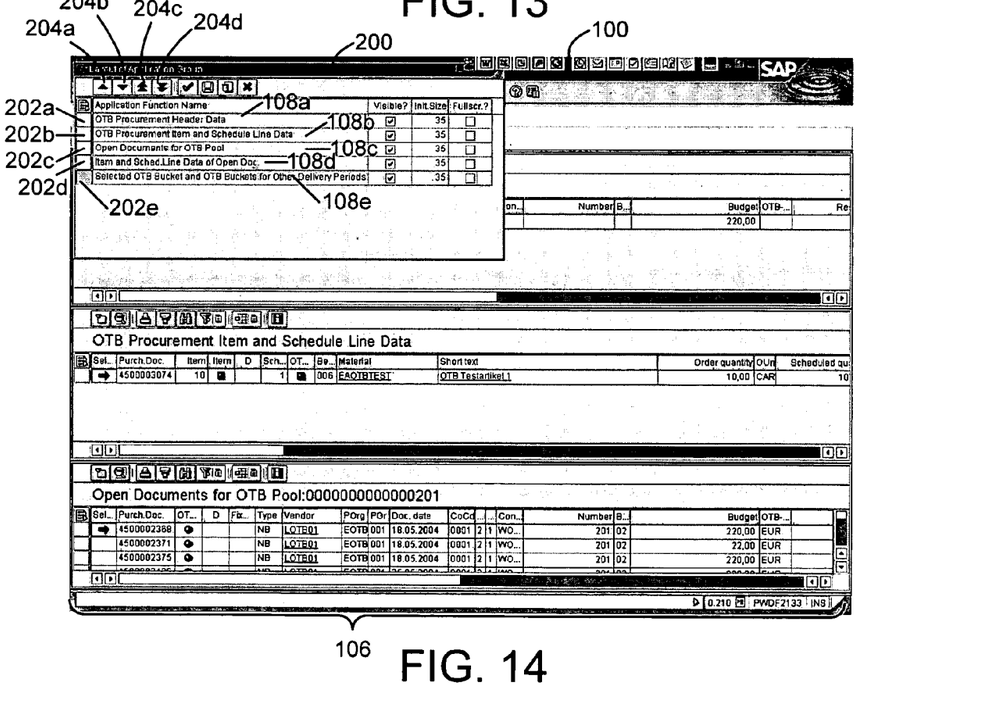
FIG. 14 illustrates an embodiment of the graphical user interface screen of FIG. 1 wherein the screen of FIG. 2 is used to change the display order of the applications.

FIG. 14 illustrates an embodiment of screen 100 wherein button 120 (shown in FIG. 13) and screen 200 are used to change the display order of applications 108 associated with the selected worklist item and available for display within screen area 106. Screen 200 includes a button 202 for each available application 108, as well as buttons 204 for moving a selected application 108 up or down in the order. In order to move an application 108 up or down in the order, the user selects the button 202 corresponding to the application to be moved and then uses one of buttons 204 to move the application up or down in the order. Button 204a moves the selected application 108 up one position in the display order. Button 204b moves the selected application down one position in the display order. Button 204c moves the selected application to the first position in the display order. Button 204d moves the application to the last position in the display order.

Figure 15:
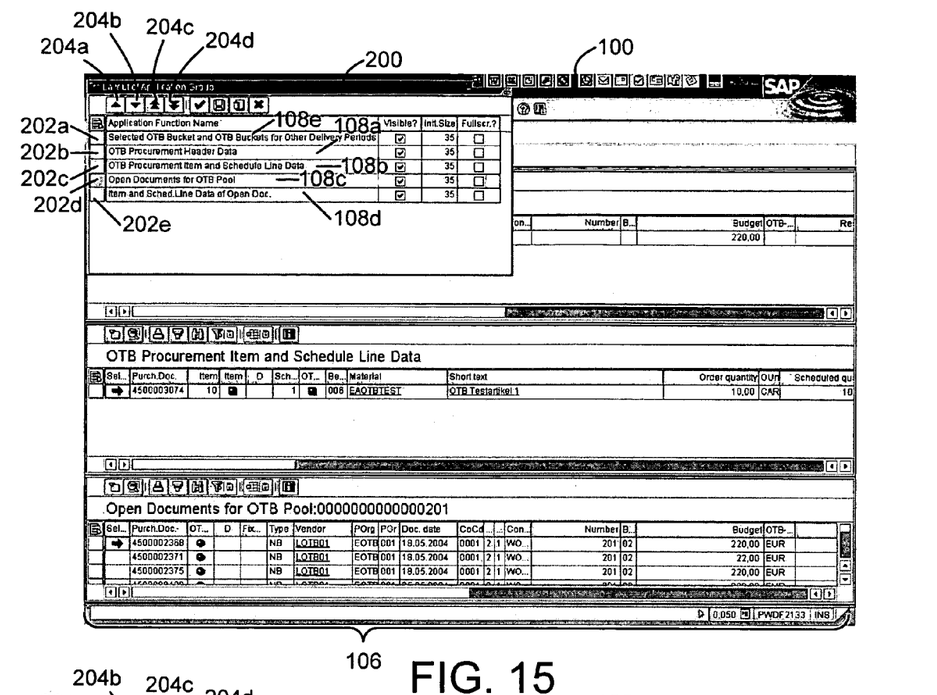
FIG. 15 illustrates the use of the screen of FIG. 2 to again change the display order of the applications according to an exemplary embodiment.
Figure 16:
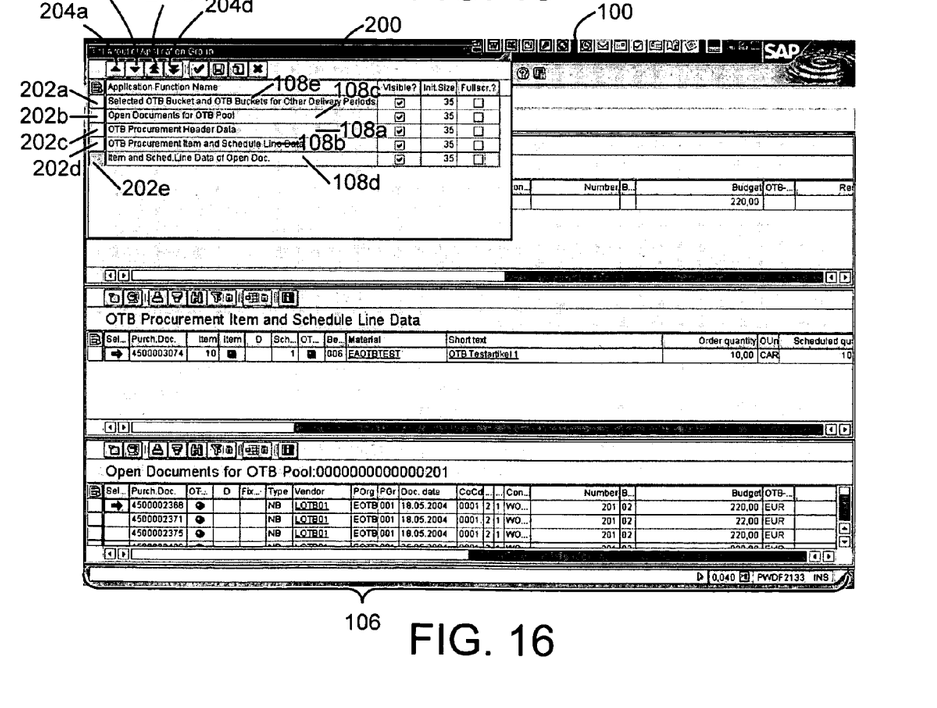
FIG. 16 illustrates the use of the screen of FIG. 2 to again change the display order of the applications according to another exemplary embodiment.
Figure 17:
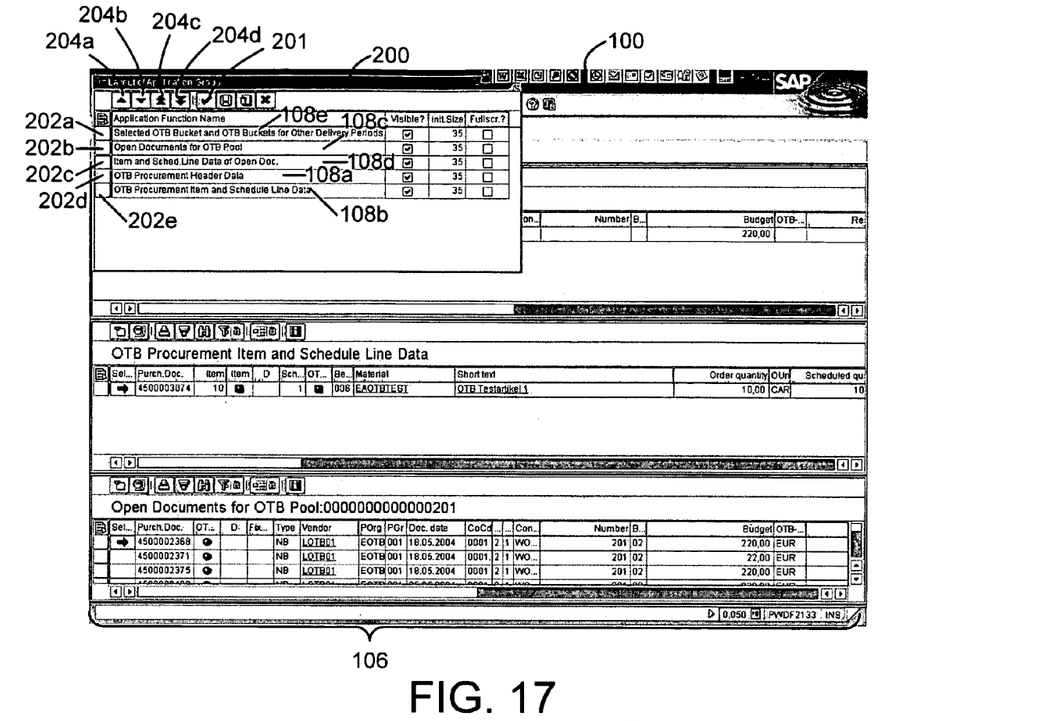
FIG. 17 illustrates the use of the screen of FIG. 2 to again change the display order of the applications according to another exemplary embodiment.

As shown in FIG. 14, to move application 108e from the last position to the first position in the display order, button 202e is selected, and then button 204c is selected. As shown in FIG. 15, application 108e is now listed in the first position of the display order, and applications 108a, 108b, 108c, and 108d have moved down one position in the display order. Similarly, to move application 108c from the fourth position in the display order to the second position in the display order, button 202d is selected and then button 204a is selected twice. As shown in FIG. 16, application 108c is now listed in the second position in the display order and applications 108a and 108b have moved down another position in the display order. To move application 108d from the last position in the display order to the third position in the display order, button 202e is selected and then button 202a is selected twice. As shown in FIG. 17, application 108d is now listed in the third position in the display order and applications 108a and 108b have moved down another position in the display order.

Figure 18:
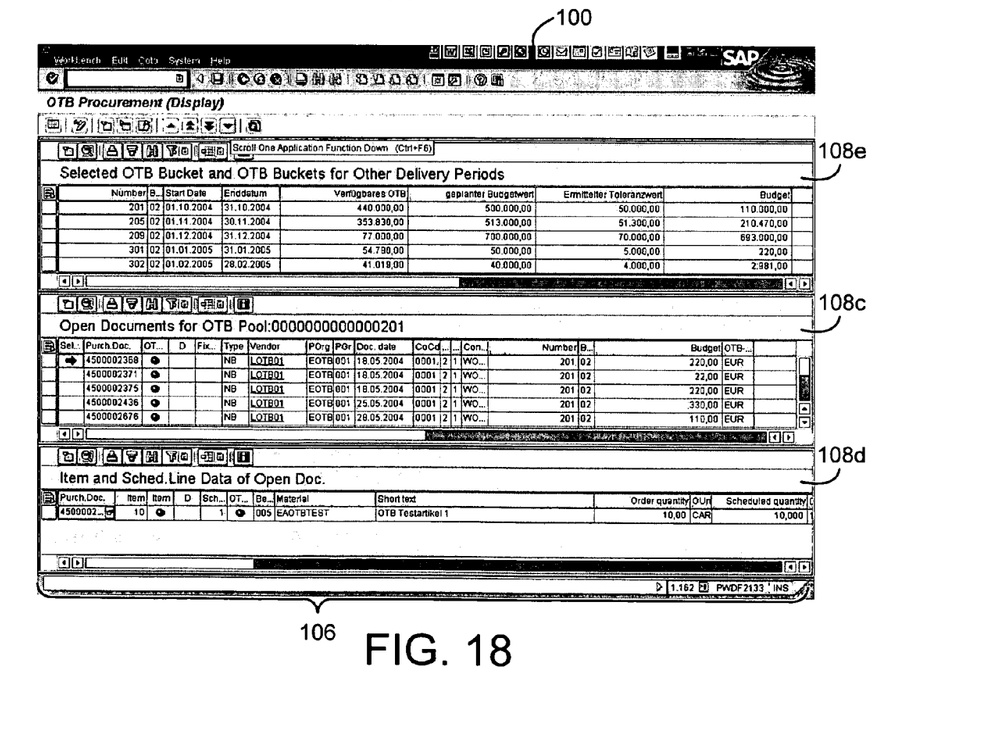
FIG. 18 illustrates an embodiment of the graphical user interface screen of FIG. 1 wherein changes to the display order as described with reference to FIGS. 14-17 have been implemented.
Figure 19:
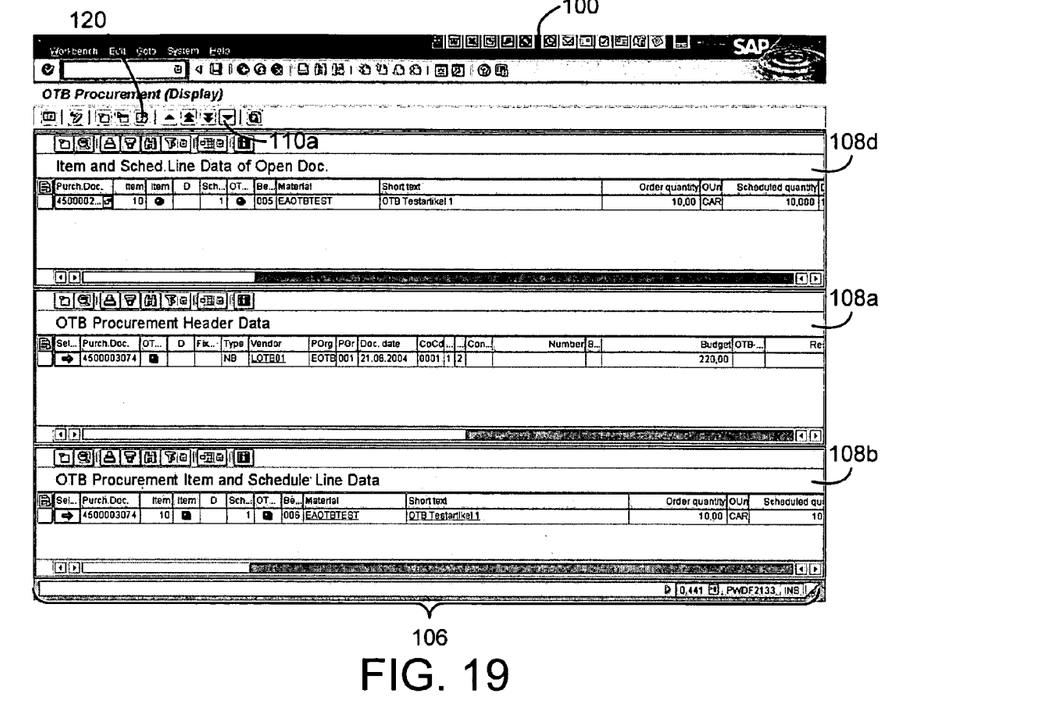
FIG. 19 illustrates another embodiment of the graphical user interface screen of FIG. 1 wherein changes to the display order as described with reference to FIGS. 14-17 have been implemented.

Selecting button 201 adopts the changes to the display order. For example, FIGS. 18-19 illustrate an embodiment of screen 100 wherein button 201 has been selected to implement the changes to the display order as described above with reference to FIGS. 14-17. As shown in FIG. 18, application 108e is now displayed as the first application in screen area 106, application 108c is now displayed as the second application in screen area 106, and application 108d is now displayed as the third application in screen area 106. As shown in FIG. 19, selecting button 110a twice to move down through the display order by two applications 108 reveals that applications 108a and 108b are now the fourth and fifth applications.

Figure 20:
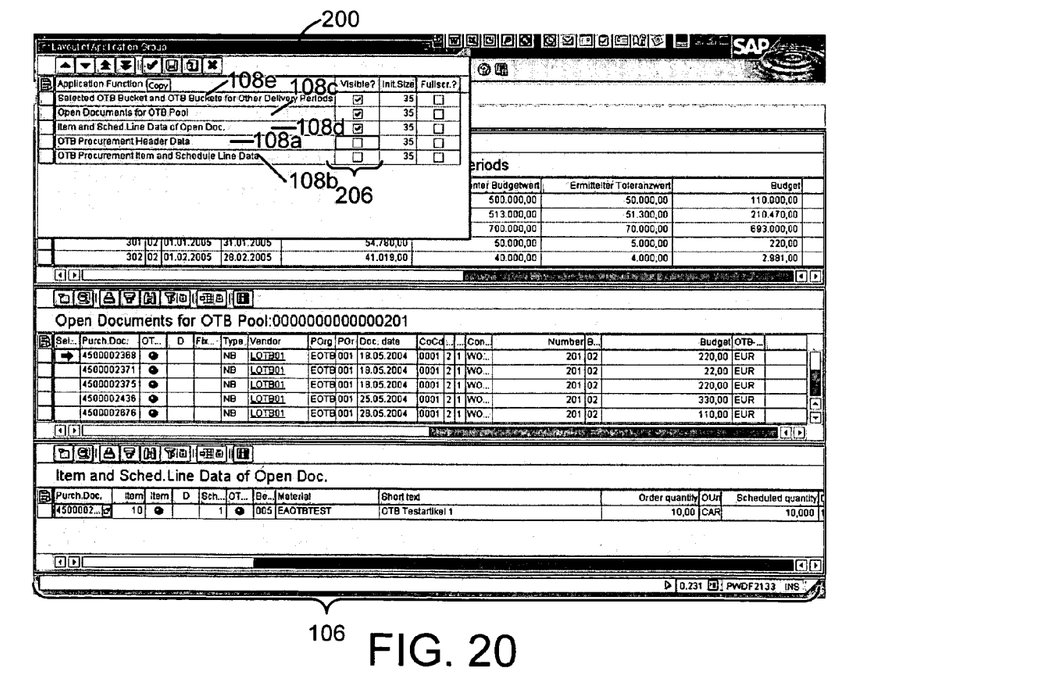
FIG. 20 illustrates an embodiment of the graphical user interface screen of FIG. 1 wherein the screen of FIG. 2 is used to select which applications available for display are to be displayed.

FIG. 20 illustrates an embodiment of screen 100 wherein button 120 (shown in FIG. 19) and screen 200 are used to select which of applications 108 associated with the selected worklist item and available for display within screen area 106 are to be displayed. Screen 200 includes a check box 206 for each available application 108. In order to select an application 108 to be removed from the list of available applications 108 to be displayed, the user deselects the checkbox next to the application 108. For example, as shown in FIG. 20, the checkboxes 206 corresponding to applications 108a and 108b have been deselected so that these applications will no longer be visible in screen area 106.

Figure 21:
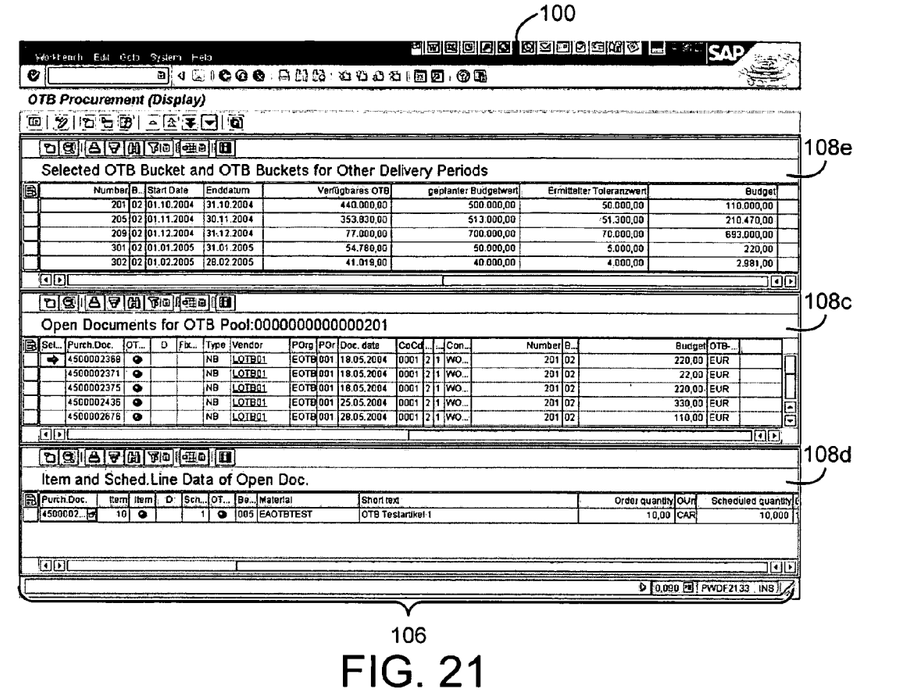
FIG. 21 illustrates an embodiment of the graphical user interface screen of FIG. 1 wherein changes to the applications selected for display as described with reference to FIG. 20 have been implemented.
Figure 22:
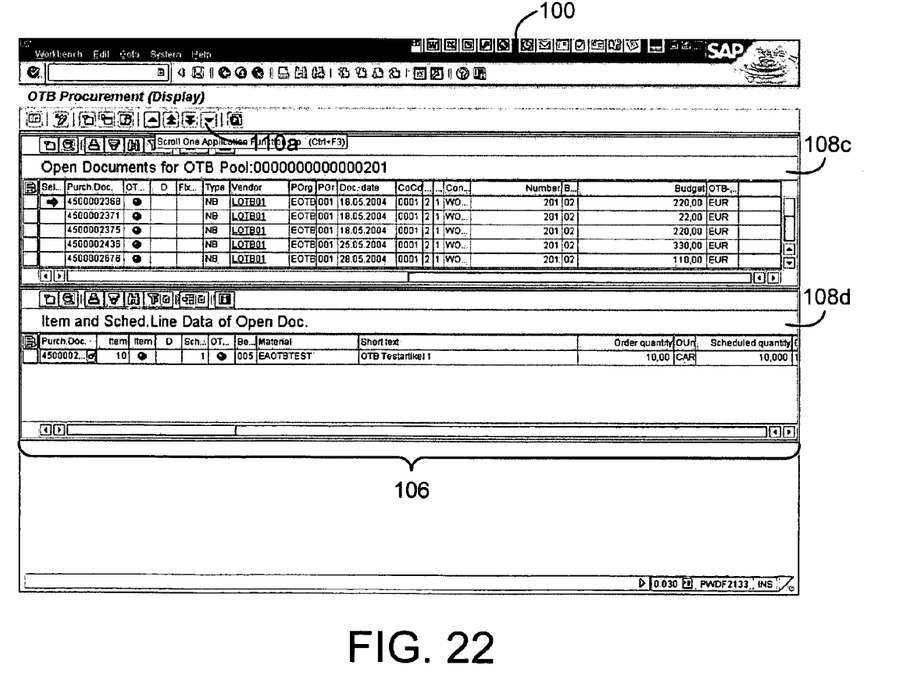
FIG. 22 illustrates another embodiment of the graphical user interface screen of FIG. 1 wherein changes to the applications selected for display as described with reference to FIG. 20 have been implemented.

Selecting button 201 adopts the changes. For example, FIGS. 21-22 illustrate an embodiment of screen 100 wherein button 201 has been selected to implement the changes to the applications selected for display as described above with reference to FIG. 20. As shown in FIG. 21, application 108e is still displayed as the first application in screen area 106, application 108c is still displayed as the second application in screen area 106, and application 108d is still displayed as the third application in screen area 106. As shown in FIG. 22, selecting button 110a to move down through the display order by 108 reveals that applications 108a and 108b are no longer displayed.

Figure 23:
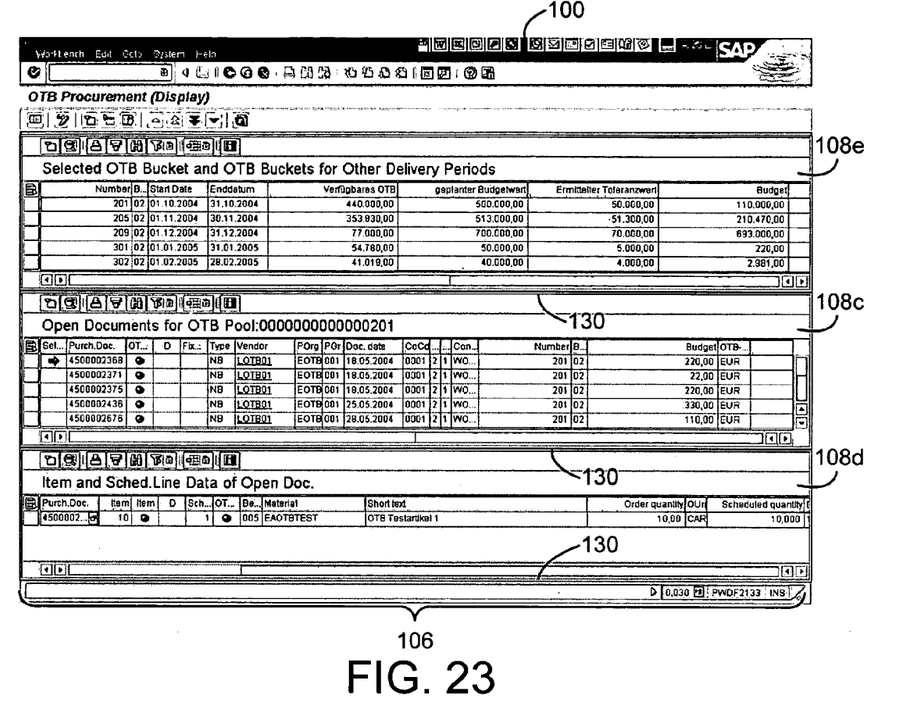
FIG. 23 illustrates an embodiment of the graphical user interface screen of FIG. 1 wherein the sizes of the individual display areas for each individual application may be changed.
Figure 24:
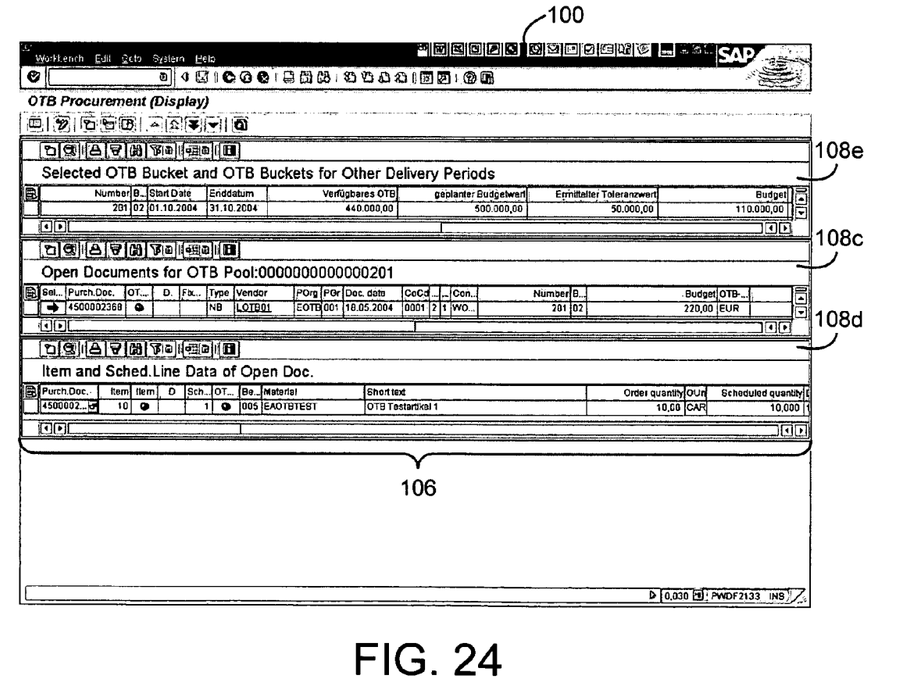
FIG. 24 illustrates an embodiment of the graphical user interface screen of FIG. 1 wherein the sizes of the individual display areas for each individual application have been decreased.

FIG. 23 illustrates an embodiment of screen 100 wherein the sizes of the individual display areas for each individual application 108 may be changed. As shown in FIG. 23, a lower border 130 for each individual application may be moved up or down to decrease or increase the size of the individual screen area for each application 108 (e.g., by selecting and "dragging" the border up or down using a mouse). FIG. 24 illustrates an embodiment of screen 100 wherein the sizes of the individual display areas for each individual application 108 have been decreased by moving up the lower borders 130 for applications 108e, 108c, and 108d respectively.

In this way, the method and system for switching among management system applications provides a unified framework for efficiently switching among applications that is easy to use. Users may switch among the various application functions using simple clicks of a mouse or other user input device to select buttons implemented as part of an overall workbench structure.

Embodiments within the scope of the present description include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The embodiments described herein may be implemented by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The method and system in some embodiments may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. The method and system may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the system might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A method of switching among management system applications, comprising:

displaying data associated with the management system applications using a graphical user interface screen having an application window with a plurality of individual areas and for use with a computerized purchase order management system for at least one of products and services, wherein the application window is configured to display concurrently a worklist in a portion of the application window, the data associated with a first management system application of a subset of the management system applications in a first individual area of the individual areas and the data associated with a second management system application of the subset of the management system applications in a second individual area of the individual areas, wherein the first management system application and the second management system application are associated with an item in the worklist;

wherein the application window includes buttons configured to facilitate switching of the subset of the management system applications displayed in the individual areas, and wherein the first individual area and the second individual area are vertically tiled and concurrently permit a user to manipulate the data displayed within the first individual area and the second individual area;

receiving a user selection of one of the buttons; and vertically scrolling the management system applications within the graphical user interface screen in response to the received user selection; and displaying concurrently the data associated with the second management system application in the first individual area and the data associated with a third management system application of the subset of the management system applications in the second individual area in response to the received user selection.

2. The method of claim 1, wherein the graphical user interface is configured to display the data associated with each of the subset of the management system applications in the individual areas based on a predetermined order.

3. The method of claim 2, wherein at least one of the buttons is configured to allow the user to switch among the individual areas for each of the management system applications one at a time based on the predetermined order.

4. The method of claim 2, wherein at least one of the buttons is configured to allow the user to switch directly to the individual area displaying data associated with one of the management system application first in the predetermined order and the management system application last in the predetermined order.

5. The method of claim 2, wherein the graphical user interface is configured to allow the user to change the predetermined order.

6. The method of claim 1, wherein the individual area for each management system application includes a button configured to change the size of the individual area from a first size to a second size larger than the first size so that the individual area is the only individual area displayed in the graphical user interface.

7. The method of claim 1, wherein the management system is a purchase order management system.

8. A system for switching among management system applications, the system comprising:
- a processor for executing instructions;
- means for displaying data associated with the management system applications using a graphical user interface screen having an application window with a plurality of individual areas and for use with a computerized purchase order management system for at least one of products and services, and for configuring the application window to display concurrently a worklist in a portion of the application window, the data associated with a first management system application of a subset of the management system applications in a first individual area of the individual areas and the data associated with a second management system application of the subset of the management system applications in a second individual area of the individual areas, wherein the first management system application and the second management system application are associated with an item in the worklist;
- wherein the application window includes buttons configured to facilitate switching of the subset of the management system applications displayed in the individual areas, and wherein the first individual area and the second individual area are vertically tiled and concurrently permit a user to manipulate the data displayed within the first individual area and the second individual area;
- means for receiving a user selection of one of the buttons;
- means for vertically scrolling the management system applications within the graphical user interface screen in response to the received user selection; and
- means for displaying concurrently the data associated with the second management system application in the first individual area and the data associated with a third management system application of the subset of the management system applications in the second individual area in response to the received user selection.

9. The system of claim 8, wherein the means for displaying data and configuring the graphical user interface is for displaying the data associated with each of the subset of the management system applications in the individual areas based on a predetermined order.

10. The system of claim 9, wherein at least one of the buttons is configured to allow the user to switch among the individual areas for each of the management system applications one at a time based on the predetermined order.

11. The system of claim 9, wherein at least one of the buttons is configured to allow the user to switch directly to the individual area displaying data associated with one of the management system application first in the predetermined order and the management system application last in the predetermined order.

12. The system of claim 9, wherein the graphical user interface is configured to allow the user to change the predetermined order.

13. The system of claim 8, wherein the individual area for each management system application includes a button configured to change the size of the individual area from a first size to a second size larger than the first size so that the individual area is the only individual area displayed in the graphical user interface.

14. The system of claim 8, wherein the management system is a purchase order management system.

15. A computer-readable storage medium storing a program product for switching among management system applications, the program product comprising machine-readable program code for causing, when executed, one or more machines to perform the following method steps:
- displaying data associated with the management system applications using a graphical user interface screen having an application window with a plurality of individual areas and for use with a computerized purchase order management system for at least one of products and services, wherein the application window is configured to display concurrently a worklist in a portion of the application window, the data associated with a first management system application of a subset of the management system applications in a first individual area of the individual areas and the data associated with a second management system application of the subset of the management system applications in a second individual area of the individual areas, wherein the first management system application and the second management system application are associated with an item in the worklist;
- wherein the application window includes buttons configured to facilitate switching of the subset of the management system applications displayed in the individual areas, and wherein the first individual area and the second individual area are vertically tiled and concurrently permit a user to manipulate the data displayed within the first individual area and the second individual area;
- receiving a user selection of one of the buttons;
- vertically scrolling the management system applications within the graphical user interface screen in response to the received selection; and
- displaying concurrently the data associated with the second management system application in the first individual area and the data associated with a third management system application of the subset of the management system applications in the second individual area in response to the received user selection.

16. The computer-readable storage medium of claim 15, wherein the graphical user interface is configured to display the data associated with each of the subset of the management system applications in the individual areas based on a predetermined order.

17. The computer-readable storage medium of claim 16, wherein at least one of the buttons is configured to allow the user to switch among the individual areas for each of the management system applications one at a time based on the predetermined order.

18. The computer-readable storage medium of claim 16, wherein at least one of the buttons is configured to allow the user to switch directly to the individual area displaying data associated with one of the management system application first in the predetermined order and the management system application last in the predetermined order.

19. The computer-readable storage medium of claim 16, wherein the graphical user interface is configured to allow the user to change the predetermined order.

20. The computer-readable storage medium of claim 15, wherein the individual area for each management system application includes a button configured to change the size of the individual area from a first size to a second size larger than the first size so that the individual area is the only individual area displayed in the graphical user interface.

21. The computer-readable storage medium of claim 15, wherein the management system is a purchase order management system.

* * * * *